(12) United States Patent
Luginsland

(10) Patent No.: US 6,890,981 B1
(45) Date of Patent: May 10, 2005

(54) RUBBER MIXTURES

(75) Inventor: Hans-Detlef Luginsland, Köln (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 09/538,941

(22) Filed: Mar. 31, 2000

(30) Foreign Application Priority Data

Apr. 3, 1999 (DE) .......................................... 199 15 281

(51) Int. Cl.$^7$ ................................................ C08L 5/54
(52) U.S. Cl. .................... 524/262; 524/261; 524/265; 524/267; 524/269; 524/609; 524/492; 524/495; 525/331.9; 525/333.3; 152/209.1
(58) Field of Search ................................ 524/267, 265, 524/263

(56) References Cited

U.S. PATENT DOCUMENTS

| | | | |
|---|---|---|---|
| 3,842,111 A | | 10/1974 | Meyer-Simon |
| 3,873,489 A | | 3/1975 | Thurn |
| 4,129,585 A | * | 12/1978 | Buder et al. ................ 556/428 |
| 5,159,009 A | * | 10/1992 | Wolff et al. ................. 524/495 |
| 5,399,739 A | * | 3/1995 | French et al. ............... 556/427 |
| 5,489,701 A | * | 2/1996 | Childress et al. ........... 556/427 |
| 5,650,457 A | * | 7/1997 | Scholl et al. ................ 524/262 |
| 6,008,295 A | * | 12/1999 | Takeichi et al. ............. 525/105 |
| 6,489,389 B1 | * | 12/2002 | Ohta et al. ................... 524/437 |

FOREIGN PATENT DOCUMENTS

| | | | |
|---|---|---|---|
| EP | 0 680 997 A1 | 11/1995 | |
| EP | 0 732 362 A1 * | 9/1996 | ........... C08L/21/00 |
| EP | 0 785 206 A1 | 7/1997 | |
| EP | 0 864 605 A2 | 9/1998 | |

OTHER PUBLICATIONS

Cassell's German Dictionary Funk & Wagnalls: New York, 1962, p. 462.*
Stochem—Specialty Chemical Distribution, webpage (one page).*
RT Vanderbilt Co., Inc.—Precipitated Silica products, webpage (two pages).*

* cited by examiner

*Primary Examiner*—David W. Wu
*Assistant Examiner*—Rip A Lee
(74) *Attorney, Agent, or Firm*—Pillsbury Winthrop LLP

(57) ABSTRACT

Rubber mixtures which contain an organosilane of the general structure $^1R^2R^3Si$—$R^4$—$Z$ (I), wherein $R^1$, $R^2$ and $R^3$ independently of one another are H, $(C_1-C_4)$alkyl, $(C_1-C_4)$alkoxy or halogen and the number of alkyl groups is $\geq 1$; $R^4$ is a linear or branched $(C_1-C_{18})$alkylidene group; and Z=H, halogen, SCN, SH or $S_x$—$R^4$—$SiR^1R^2R^3$, where x is 2 to 10. The rubber mixtures are useful in molding compositions particularly for tires and tire treads.

18 Claims, No Drawings

RUBBER MIXTURES

CROSS-REFERENCE TO RELATED APPLICATION

This application is based on German Application DE 199 15 281.0, filed Apr. 3, 1999, which disclosure is incorporated herein by reference.

FIELD OF THE INVENTION

The present invention relates to rubber mixtures, to a process for their preparation and to the production of moldings using the rubber mixtures.

BACKGROUND OF THE INVENTION

It is known to use sulfur-containing organosilicon compounds, such as 3-mercaptopropyltrimethoxysilane, 3-thiocyanatopropyltriethoxysilane or bis(3-{triethoxysilyl}propyl)tetrasulfane, as silane coupling agents or reinforcing additives in oxide-filled rubber mixtures, inter alia for the production of treads and other parts of automobile tires (DE 2 141 159, DE 2 212 239, DE 195 444 69 A1, U.S. Pat. Nos. 3,978,103, 4,048,206, EP 784 072 A1).

The additional use of alkylsilanes in rubber mixtures to reduce the mixing viscosity is also known (EP 795 577 A1, EP 864 605 A2).

In the preparation of rubber mixtures with organosilanes and a filler, for example a precipitated silicic acid, a chemical reaction takes place during the mixing process, for example in an internal mixer. This chemical reaction is a condensation reaction which is accompanied by the release of a considerable amount of alcohol. As described in the literature [A. Hunsche, U. Görl, A. Müller, M. Knaack, T. G öbel, Kautsch. Gummi, Kunstst. 50, 881 (1997)], this condensation reaction is made up of a primary reaction, in which an ethoxy group reacts with a silanol group from the silicic acid, and a secondary reaction between two ethoxy groups, which results in crosslinking between the silane molecules. According to the state of the art, up to three mol of ethanol can be eliminated per mol of silicon by these reactions when silanes containing three ethoxy functional groups are used.

In some cases this eliminated alcohol causes appreciable technical problems in the further processing of the rubber mixtures, such as the porosity of the mixture during extrusion or undesired blistering in the rubber itself. Furthermore, it is in the interest of health and the environment to reduce the amount of alcohol released during the reaction.

SUMMARY OF THE INVENTION

It has now been found that these disadvantages in the state of the art can be greatly mitigated by the use of organosilanes in which the trialkoxysilyl functional group used hitherto is replaced with silyl functional groups containing fewer alkoxy groups.

Accordingly, the present invention relates to the use of organosilanes of the general structure $R^1R^2R^3Si-R^4-Z$ (I), in which the organosilane contains fewer than 3 ethoxy groups per silicon atom.

The invention provides rubber mixtures which are characterized in that they contain organosilanes of the general structure $$R^1R^2R^3Si-R^4-Z \qquad (I)$$

wherein
$R^1$, $R^2$ and $R^3$ independently of one another are H, $(C_1-C_4)$alkyl, $(C_1-C_4)$alkoxy or halogen and the number of alkyl groups is $\geq 1$; $R^4$ is a linear or branched $(C_1-C_{18})$ divalent hydrocarbon group; and Z=H, halogen, SCN, SH or $S_x-R^4-SiR^1R^2R^3$, where x is 2 to 10.

Preferred organosilanes of the type described above are those with dialkylmonoalkoxysilyl functional groups in place of the trialkoxysilyl functional groups conventionally used. Particularly preferred silanes are the bis(3-{dimethylethoxysilylpropyl}polysulfanes) according to the invention.

Rubber mixtures according to the invention may include organosilanepolysulfane and organoalkylsilane compounds. The organosilane polysulfane may be a silane in which $R^1$=ethoxy or methoxy, $R^2=R^3$=methyl, $R^4$=propylene or isobutylene and $Z=S_x-R^4-SiR^1R^2R^3$, where x has a statistical mean value of 2 to 4. In another embodiment, the organosilane may be a silane in which $R^1$=ethoxy or methoxy, $R^2=R^3$=methyl and $R^4=(C_1-C_{18})$ divalent hydrocarbon group.

The present invention therefore provides rubber mixtures containing rubber, filler, especially including precipitated silicic acid, optionally other rubber auxiliaries, and at least one organosilane which is built up of the structural units described above and which is used in amounts of 0.1 to 15 wt. %, based on the amount of rubber used. The organosilane may include an organosilanepolysulfane such as bis(3-{dimethylethoxysilyl}propyl)tetrasulfane or bis(3-{dimethylethoxysilyl}propyl)disulfane, optionally with an alkylsilane.

Because of the smaller number of alkoxy groups in the organosilanes of general structure (I), the disadvantageous release of alcohol is reduced when these organosilanes are used in rubber mixing processes. Compared with the known procedure, e.g. using bis(3-{triethoxysilyl}propyl) tetrasulfane (TESPT) as coupling agent, the maximum possible release of alcohol is reduced by 66%.

Surprisingly, it has now also been found that the rubber mixtures prepared with the silanes according to the invention, and the vulcanizates prepared therefrom, do not exhibit any disadvantages in respect of their engineering properties compared with the comparative reference material containing a triethoxysilyl functional group, according to the state of the art (See Comparative Example 1 and Inventive Example 2).

The organosilanes according to the invention and the fillers are preferably added at stock temperatures of 100° to 200° C., but they can also be added later at lower temperatures (40° to 100° C.), for example, together with other rubber auxiliaries.

The organosilanes can be introduced into the mixing process either in pure form or adsorbed on an inert organic or inorganic carrier. Preferred carrier materials are silicic acids, natural or synthetic silicates, aluminum oxide or carbon blacks.

The following fillers are suitable for the rubber mixtures according to the invention:
Carbon blacks: The carbon blacks to be used here are prepared by the lamp black, furnace black or gas black process and have BET surface areas of 20 to 200 m²/g, e.g. SAF, ISAF, HSAF, HAF, FEF or GPF carbon blacks. The carbon blacks can optionally also contain heteroatoms such as Si.
Highly disperse silicic acids, prepared e.g. by the precipitation of silicate solutions or the flame hydrolysis of silicon halides, with specific surface areas of 5 to 1000, preferably 20 to 400 m$^2$/g (BET surface area), and with primary particle sizes of 10 to 400 nm. The silicic acids can optionally also take the form of mixed oxides with other metal oxides such as Al, Mg, Ca, Ba, Zn and titanium oxides.

Synthetic silicates, such as aluminium silicate, or alkaline earth metal silicates like magnesium silicate or calcium silicate, with BET surface areas of 20 to 400 m$^2$/g and primary particle diameters of 10 to 400 nm.

Natural silicates, such as kaolin and other naturally occurring silicic acids.

Glass fibers and glass fiber products (mats, strands) or glass microspheres.

It is preferred to use carbon blacks with BET surface areas of 20 to 400 m$^2$/g or highly disperse silicic acids, prepared by the precipitation of silicate solutions, with BET surface areas of 20 to 400 m$^2$/g in amounts of 5 to 150 parts by weight, based in each case on 100 parts of rubber.

These fillers can be used separately or in a mixture. In one particularly preferred embodiment of the process, the mixtures are prepared using 10 to 150 parts by weight of white fillers, optionally together with 0 to 100 parts by weight of carbon black, and 0.3 to 10 parts by weight of a compound of formula (I), based in each case on 100 parts by weight of rubber.

Apart from natural rubber, synthetic rubbers are also suitable for preparing the rubber mixtures according to the invention. Preferred synthetic rubbers are described for example in W. Hofmann, Kautschuktechnologie (Rubber Technology), Genter Verlag, Stuttgart 1980. They include inter alia:

polybutadiene (BR)

polyisoprene (IR)

styrene/butadiene copolymers with styrene contents of 1 to 60 wt. %, preferably 2 to 50 wt. % (SBR)

isobutylene/isoprene copolymers (IIR)

butadiene/acrylonitrile copolymers with acrylonitrile contents of 5 to 60 wt. %, preferably 10 to 50 wt. % (NBR)

partially hydrogenated or fully hydrogenated NBR (HNBR)

ethylene/propylene/diene copolymers (EPDM)

and mixtures of these rubbers. Anionically polymerized solution SBRs with a glass transition temperature above −50° C., and mixtures thereof with diene rubbers, are of particular interest for the production of automobile tires.

The rubber vulcanizates according to the invention can contain other rubber auxiliaries known to the rubber industry, such as reaction accelerators, antioxidants, heat stabilizers, light stabilizers, antiozone agents, processing aids, plasticizers, tackifiers, blowing agents, dyes, pigments, waxes, extenders, organic acids, retarders, metal oxides, and activators such as triethanolamine, polyethylene glycol and hexanetriol.

The rubber auxiliaries are used in conventional amounts, which depend inter alia on the intended use. Conventional amounts are e.g. amounts of 0.1 to 50 wt. %, based on rubber. The organosilanes with rubber-reactive groups can be used on their own as crosslinking agents. It is normally advisable to add other crosslinking agents. Other known crosslinking agents which can be used are sulfur or peroxides. The rubber mixtures according to the invention can also contain vulcanization accelerators, examples of suitable vulcanization accelerators being mercaptobenzthiazoles, sulfenamides, guanidines, thiurams, dithiocarbamates, thioureas and thiocarbonates. The vulcanization accelerators and the sulfur or peroxides are used in amounts of 0.1 to 10 wt. %, preferably 0.1 to 5 wt. %, based on rubber.

The vulcanization of the rubber mixtures according to the invention can be carried out at temperatures of 100° to 200° C., preferably 130° to 180° C., optionally under a pressure of 10 to 200 bar. The rubbers can be mixed with the filler, the rubber auxiliaries, if appropriate, and the silanes of general structure (I) in conventional mixers such as rolls, internal mixers and mixer-extruders. The rubber vulcanizates according to the invention are suitable for the production of mouldings, e.g. for the manufacture of pneumatic tires, tire treads, cable sheathing, hosing, transmission belts, conveyor belts, roll covers, tires, shoe soles, gaskets and damping elements.

DETAILED DESCRIPTION OF THE PREFERRED EMBODIMENTS

EXAMPLES

Preparation of Rubber Mixtures and Vulcanizates

General Operating Instructions

The rubber mixture is prepared in two stages in an internal mixer (Werner & Pfleiderer GK1.5N) with mixing times of 6 and 5 minutes at a speed of rotation of 60–70 rpm up to a discharge temperature of max. 155° C., followed by a mixing stage in an internal mixer at max. 90° C., the formulation being as indicated in Table 1 below, where the unit phr denotes parts by weight based on 100 parts of raw rubber used.

General processes for the preparation of rubber mixtures and vulcanizates thereof are described for example in "Rubber Technology Handbook", W. Hofmann, Hanser Verlag 1994.

The vulcanization times at 165° C. are 16 and 30 minutes for the test pieces of Examples 1 and 2 respectively.

TABLE 1

| Substance | Amount [phr] |
|---|---|
| 1st stage | |
| Buna VSL 5025-1 | 96.0 |
| Buna CB 24 | 30.0 |
| Ultrasil VN3 GR | 80.0 |
| ZnO | 3.0 |
| Stearic acid | 2.0 |
| Naftolen ZD | 10.0 |
| Vulkanox 4020 | 1.5 |
| Protector G35P | 1.0 |
| Silane | acc. to Ex. 1, 2 |
| 2nd stage | |
| Batch stage 1 | |
| 3rd stage | |
| Batch stage 2 | |
| Perkacit TBZTD | 0.2 |
| Vulkacit D | 2.0 |
| Vulkacit CZ | 1.5 |
| Sulfur | 1.5 |

The polymer BUNA VSL 5025-1 is a solution-polymerized SBR copolymer from Bayer AG with a styrene content of 25 wt. % and a butadiene content of 75 wt. %. Of the butadiene, 73% is 1,2-linked, 10% cis-1,4-linked and 17% trans-1,4-linked. The copolymer contains 37.5 phr of oil and has a Mooney viscosity (ML 1+4/100° C.) of 50±5.

The polymer BUNA CB 24 is a cis-1,4-polybutadiene (neodymium type) from Bayer AG with a cis-1,4 content of 97%, a trans-1,4 content of 2%, a 1,2 content of 1% and a Mooney viscosity of between 39 and 49.

The silicic acid ULTRASIL VN3 GR from Degussa AG has a BET surface area of 175 m²/g. TESPD (bis(3-[triethoxysilyl]propyl)disulfane) of Comparative Example 1 is prepared according to patent D 195 414 04. The silane of Example 2, bis(3-[dimethylethoxysilyl]propyl)disulfane, is prepared according to the state of the art by the hydrosilylation of chlorodimethylsilane with allyl chloride, followed by ethanolysis and sulfurization analogously to the process indicated in patent D 197 342 95 A1.

The aromatic oil used is NAFTOLEN ZD from Chemetall. VULCANOX 4020 is PPD from Bayer AG and PROTEKTOR G35P is an antiozone wax from HB-Fuller GmbH. VULKACIT D (DPG) and VULKACIT CZ (CBS) are commercial products from Bayer AG. PERKACIT TBZTD is a commercial product from Flexis S. A.

The engineering properties of the rubber are tested by the methods indicated in Table 2.

TABLE 2

| Physical test | Standard/Conditions |
| --- | --- |
| ML 1 + 4, 100° C. | DIN 53523/3, ISO 667 |
| Vulcameter test, 165° C. | DIN 53529/3, ISO 6502 |
| Ring tensile test, 23° C. | DIN 53504, ISO 37 |
| Tensile strength | |
| Tensile stresses | |
| Elongation at break | |
| Shore A hardness, 23° C. | DIN 53 505 |
| Ball rebound, 0, 23 and 60° C. | ASTM D 5308 |
| Viscoelast. Prop., 0 and 60° C. | DIN 53 513, ISO 2856 |
| E* | |
| tan δ | |
| DIN abrasion, 10 N force | DIN 53 516 |
| Dispersion | ISO/DIS 11345 |

Examples 1 and 2

Example 1 (Comparative Example) and Example 2 (Invention) are carried out in accordance with the general operating instructions.

As distinct from Comparative Example 1 with 5.8 phr of TESPD, 4.3 phr of bis(3-{dimethylethoxysilyl}propyl)disulfane, corresponding to an equimolar dosage, are added to the mixture of Example 2 of the invention. The engineering data for the raw rubber mixture and the vulcanizate are as follows (Table 3):

TABLE 3

| Characteristic | Unit | Ex. 1 | Ex. 2 |
| --- | --- | --- | --- |
| Raw mixture | | | |
| ML (1 + 4) (3rd stage) | MU | 69 | 74 |
| MDR, 165° C. | | | |
| Dmax-Dmin | dNm | 14.1 | 13.8 |
| t 10% | min | 2.4 | 3.1 |
| Vulcanizate | | | |
| Ring tensile test | | | |
| Tensile strength | Mpa | 16.3 | 17.1 |
| Tensile stress at 100% elongation | Mpa | 1.5 | 1.6 |
| Tensile stress at 300% elongation | Mpa | 6.2 | 6.4 |
| Elongation at break | % | 540 | 560 |
| Shore A hardness | SH | 60 | 59 |
| DIN abrasion | mm³ | 100 | 110 |
| Ball rebound (0° C.) | % | 12.5 | 11.6 |
| Ball rebound (23° C.) | % | 34.3 | 32 |
| Ball rebound (60° C.) | % | 59.8 | 59.4 |

TABLE 3-continued

| Characteristic | Unit | Ex. 1 | Ex. 2 |
| --- | --- | --- | --- |
| Dynamic testing | | | |
| Dyn. Modulus E* (0° C.) | Mpa | 16.7 | 17.1 |
| Dyn. Modulus E* (60° C.) | MPa | 7.3 | 7.3 |
| Modulus loss factor tan δ (0° C.) | — | 0.444 | 0.476 |
| Modulus loss factor tan δ (60° C.) | — | 0.143 | 0.131 |
| Dispersion | — | 6 | 6 |

The data in Table 3 prove that the use of the dimethylethoxysilane according to the invention (Ex. 2) causes no impairment of the engineering properties of the rubber compared with triethoxysilane according to the state of the art (Ex. 1). Rather, there is actually an advantage in the reduced value of tan δ (60° C.), which correlates with the rolling resistance.

What is claimed is:

1. A rubber mixture comprising solution polymerized styrene-butadiene copolymer and organosilanes of the general structure:

$$R^1R^2R^3Si-R^4-Z \qquad (I)$$

wherein
$R^1$=ethoxy, $R^2=R^3$=methyl, $R^4$ is a linear or branched ($C_3-C_{18}$) divalent hydrocarbon group; and Z=H, SCN, SH or $S_x-R^4-SiR^1R^2R^3$, where x is 2 to 10.

2. Rubber mixtures according to claim 1, comprising the organosilanes in an amount of 0.1 to 15 wt. %, based on the amount of rubber used.

3. Rubber mixtures according to claim 1, comprising a silicic acid as filler and an organosilanepolysulfane selected from the group consisting of bis(3-{dimethylethoxysilyl}propyltetrasulfane and bis(3-{dimethylethoxysilyl}propyl)-disulfane.

4. Process for the preparation of rubber mixture comprising at least one filler in addition to the rubber, said process comprising adding an organosilane polysulfane according to claim 1 in said rubber mixture.

5. A molding obtained from a rubber mixture according to claim 1.

6. A pneumatic tire comprising the molding according to claim 5.

7. A tire tread comprising the molding according to claim 5.

8. A method for using rubber mixtures according to claim 1 for the production of moldings, comprising adding said rubber mixture to a molding composition, and molding the molding composition in a mold for tires or tire treads.

9. A rubber mixture comprising solution polymerized styrene-butadiene copolymer, and a mixture of organosilanes of the general structure:

$$R^1R^2R^3Si-R^4-Z \qquad (I)$$

wherein
$R^1$=ethoxy, $R^2=R^3$=methyl, $R^4$ is a linear or branched ($C_3-C_{18}$) divalent hydrocarbon group; and Z=H, SCN, SH or $S_x-R^4-SiR^1R^2R^3$, where x is 2 to 10, and an organoalkylsilane.

10. Rubber mixtures according to claim 9, wherein the organosilane is an organosilanepolysulfane in which:
$R^4$=propylene or isobutylene, $Z=S_x-R^4-SiR^1R^2R^3$, and x has a statistical mean value of 2 to 4.

11. A rubber mixture comprising solution polymerized styrene-butadiene copolymer and a silicic acid as filler and an organosilanepolysulfane selected from the group consisting of bis(3-{dimethylethoxysilyl}propyltetrasulfane and bis(3-{dimethylethoxysilyl}propyl)-disulfane, and an alkylsilane other than said organosilanepolysulfane.

12. Process for the preparation of rubber mixtures which contain at least one filler in addition to the rubber, comprising adding an organosilanepolysulfane of the general structure $$R^1R^2R^3Si-R^4-Z \quad (I)$$

wherein $R^1$=ethoxy, $R^2$=$R^3$=methyl, $R^4$ is a linear or branched ($C_3$–$C_{\_}$) divalent hydrocarbon group; and Z=$S_x$—$R^4$—$SiR^1R^2R^3$, where x is 2 to 10, and an organoalkylsilane.

13. A rubber mixture comprising solution polymerized styrene-butadiene copolymers and an organosilane of formula (I):

$$R^1R^2R^3Si-R^4-Z \quad (I)$$

wherein $R^1$=ethoxy, $R^2$=$R^3$=methyl, $R^4$ is a linear or branched ($C_3$–$C_{18}$) divalent hydrocarbon group; and Z=H, halogen, SCN, SH or $S_x$—$R^4$—$SiR^1R^2R^3$, where x is 2 to 10; and wherein the organosilane is mixed with the rubber in unsupported form or supported on a carrier selected from the group consisting of silicic acids, natural silicates, synthetic silicates, aluminum oxide, and carbon black.

14. Rubber mixture according to claim 13, wherein the organosilane is bis(3-{dimethylethoxysilyl}propyltetrasulfane or bis(3-{dimethylethoxysilyl}propyl)-disulfane.

15. Rubber mixture according to claim 14, further comprising an alkylsilane other than said organosilane.

16. A molding obtained from the rubber mixture of claim 13.

17. A pneumatic tire comprising a molding according to claim 16.

18. A tire tread comprising a molding according to claim 16.

* * * * *